United States Patent [19]

Isermann

[11] Patent Number: 4,523,714
[45] Date of Patent: Jun. 18, 1985

[54] HEATING APPARATUS

[75] Inventor: Rolf Isermann, Seeheim-Jugenheim, Fed. Rep. of Germany

[73] Assignee: Centra-Bürkle GmbH & Co., Schönaich, Fed. Rep. of Germany

[21] Appl. No.: 477,148

[22] Filed: Mar. 21, 1983

[30] Foreign Application Priority Data

Mar. 22, 1982 [DE] Fed. Rep. of Germany ....... 3210428

[51] Int. Cl.$^3$ ............................................... F24D 3/00
[52] U.S. Cl. ................................ 236/46 R; 237/8 R; 364/505
[58] Field of Search .............. 364/505; 236/46 R, 49, 236/91 R, 91 F; 237/8 R

[56] References Cited

U.S. PATENT DOCUMENTS

| 4,247,040 | 1/1981 | Davey | 236/46 R |
| 4,345,714 | 8/1982 | Kojima | 236/46 R |
| 4,386,649 | 6/1983 | Hines et al. | 236/46 R |

FOREIGN PATENT DOCUMENTS 1461767 11/1965 France .

OTHER PUBLICATIONS

Praktische Mathematik by Zurmühl (Springer-Verlag), Berlin 1965, pp. 18-20.

Primary Examiner—Henry Bennett
Attorney, Agent, or Firm—Karl F. Ross; Herbert Dubno

[57] ABSTRACT

A heating system is controlled in response to the external temperature in accordance with a heating curve in which the external temperature is related to the advance heating temperature of a fluid used in heating the space. According to the invention, the heating curve is optimized automatically by approximating it with a heating curve equation having at least one parameter which is calculated at least in part from measured instantaneous values of the advance heating temperature, the external temperature or the room temperature, or values representing temperature differential such as the difference between the external temperature and the room temperature and the difference between the room temperature and the advance heating temperature. From these values, a parameter of the heating curve equation is calculated by an estimation method, e.g. recursive or nonrecursive least squares, and the thus calculated parameter is introduced into the heating curve equation to establish the new transfer function of the control system.

14 Claims, 2 Drawing Figures

HEATING APPARATUS

FIELD OF THE INVENTION

My present invention relates to a method of operating a control system for a heating apparatus, to a control system for a heating apparatus, to a heating apparatus operated by the improved method and, specifically to a method of and a system for optimizing the heating curve of a heating apparatus, installation or plant.

BACKGROUND OF THE INVENTION

It is known to provide a system for automatically optimizing the heating curve of a circulating fluid heater or a heating circuit of a heating plant or apparatus for space heating purposes, e.g. of a building, the building zone or the like, in which the temperature to which a fluid is heated is a function of the ambient or external temperature and this relationship is defined by the heating curve.

The principles of such a system are applicable to any heating system in which the temperature of a fluid used to directly or indirectly heat a space, is raised in accordance with the exterior temperature in dependence upon a heating curve.

In French Pat. No. 1,461,767, for example, the automatic optimization of the heating curve is provided by controlling the room temperature and adjusting at least one parameter of the heating curve in dependence upon deviations from the setpoint or control parameter automatically in the sense that these deviations are reduced.

A heating curve is thus automatically approximated by the values of the heating supplied to the space-heating system and after some time, control of the room temperature can be terminated and further regulation of the temperature of the heating fluid can result exclusively in dependence upon the exterior temperature.

Put otherwise, once an optimum heating curve is established for a particular location, the heating system can initially be controlled in accordance with the heating curve, the interior temperature can be measured and deviations of the measured value from the predicted or setpoint value of the heating curve can be established, the heating curve adjusted in accordance with these measured values to minimize the deviation and thereby being optimized, and further control of the heating effected exclusively as a function of the external temperature in accordance with the optimized heating curve obtained by minimizing the deviations.

While this system is supposed to operate well where there are no perturbations, unpredictable effects are generally encountered in practice. For example, an unforeseeable event which would disturb the optimization of the heating curve can be the opening or closing of a window at unpredictable and random time intervals.

In practice, therefore, it is desirable to automatically optimize the heating curve by which a space is heated even where perturbations of the aforedescribed type may be encountered, i.e. where unpredictable events may cause dislocation of the room temperature and hence place unpredictable demands on the heating system at temporally unforeseeable points and to unforeseeable degrees. The advantage, of course, of optimizing the heating curve is to make the control of the heating operations less sensitive to such perturbations. In the past, systems for controlling the temperature of a given space in accordance with external temperatures have not been of a type which could allow automatic optimization with modern electronics such as microprocessors and microprocessor circuitry.

OBJECTS OF THE INVENTION

It is the principal object of the present invention to provide an improved method of operating a heating system whereby the aforementioned disadvantages are obviated and, more specifically, the automatic optimization of a heating curve is attained with a technique which is less sensitive to unpredictable phenomenon and whereby control can be effected with microprocessors and like local simple and convenient circuit elements.

Still another object of this invention is to provide an improved control method or method of optimizing the heating curve of a space heating system with the latter advantages.

Yet another object of the invention is to provide a control system for a heating apparatus or plant which affords more accurate control of temperature of an interior space in response to the external temperature utilizing microprocessors or like controllers.

It is also an object of the invention to provide an improved space-heating system with simpler but more accurate control of the internal temperature in accordance with the external temperature.

SUMMARY OF THE INVENTION

These objects and others which will become more apparent hereinafter are attained, in accordance with the invention, in a method for preferably automatically optimizing the heating curve of a heating circuit of a heating apparatus for an interior space in which the temperature to which the circuit is heated is ultimately controlled in dependence upon the exterior temperature with the dependency being determined by the heating curve.

According to this invention, the heating curve represents a heating curve equation including at least one parameter which is approximated by a value for each particular point in time as a function, directly or indirectly of instantaneous values of $T_A$, $T_V$ and $T_R$ wherein $T_A$ represents the external or ambient temperature, $T_V$ represents the temperature to which a fluid is heated or a value corresponding thereto (i.e. a heating capability value such as the thermal energy delivered to the heating medium, flow of the heating to the room or the like) and $T_R$ represents room temperature of the room heated by circuit or an average value of the room temperature of several rooms heated by the circuit of the structure.

More specifically, the invention provides a method for automatically optimizing the heating curve of a heating circuit of a heating apparatus, installation or plant in which the heating curve determines the advance heating temperature $T_V$ of the heating medium in accordance with external temperature.

According to the principles of the present invention, the automatic optimization of the heating curve is effected by approximating the heating curve with a heating curve equation containing at least one parameter which is determined by a statistical regression method, e.g. a parameter estimation process, from instantaneous values of $T_A$, $T_V$ and $T_R$.

The heating installation or apparatus of the invention can have one or more heating circuits. A heating circuit is defined, for the purposes of the present invention, as one or more space heaters disposed in one or more rooms of a building or in one or more zones of a building, and a duct system communicating with this space heater or these space heaters and supplied with a heating medium which is raised to the advance heating temperature mentioned previously.

While the preferred heating medium is water is recirculated, other heating fluids can be used as well According to the invention, means is provided to heat the heating medium to the advance heating temperature in response to the external temperature in accordance with the heating curve.

The latter means can include one or more mixing valves adapted to mix fluid from one source with fluid from another source in appropriate proportions to establish the advance heating temperature.

According to another feature of the invention, the latter means can include three-port or four-port mixing valves and the valves can be electrically controlled. In the simplest form of the invention, the heating apparatus comprises a single heating circuit which can include a boiler or other water-heating means whose output temperature corresponds to the advance heating temperature of the water delivered to the ductwork of the heating circuit.

When the plant includes a number of heating circuits which are to be fed with water from a single boiler, the output temperature of the boiler water can be constant or can change in accordance with some linear function of demand or some other parameter and the boiler can contribute hot water to the respective heating circuits under the control of mixing valves, pumps or the like which, in turn, are controlled in accordance with the external temperature to regulate the advance heating temperature of the fluid in each circuit in accordance with the associated heating curve.

I have referred previously to the exterior temperature $T_A$, i.e. the atmospheric temperature, which is a function, of course, of ambient or weather conditions. This temperature, to the extent that it is utilized in accordance with the invention, can be the external air temperature alone, or the external air temperature modified by one or more factors which are determined by other weather parameters such as wind, solar radiation, humidity or the like. Thus if solar radiation may contribute heat to the building at a given external air temperature, the actual value of $T_A$ which is used for the purposes of the invention may be increased by a factor determined by the height of the sun over the horizon, the season of the year, the proportion of sky-cloud coverage or the like. Conversely, if strong winds tend to reduce the effective value of the external air temperature in accordance with, say, the principles of the wind-chill factor, the value of $T_A$ which is utilized can be similarly reduced.

The room temperature $T_R$ utilized for the purposes of the present invention can refer to the temperature of a single heated room or an average value of the actual temperatures of several selected heated rooms or a value averaged over the heated space from measurements taken at a variety of locations. In general, it is sufficient to utilize the actual room temperature as measured in a single room even where the heating circuit operates with a plurality of many rooms of a building, to optimize the heating curve. The external temperature which is used in conjunction with this room temperature may also be an average of a number of values and, for example, may have a value which is weighted average of an actual air temperature and a wall temperature of the room.

According to the invention, at least one parameter of the heating curve-approximating equation is generated at each of a multiplicity of times from corresponding instantaneous values of the external temperature $T_A$, the advance heating temperature $T_V$ and the room temperature $T_R$ by a statistical regression method such as the parameter estimation method. To calcalute these values of the parameter of the heating curve equation with precision, relatively large numbers of the instantaneous triplet values $T_A$, $T_V$ and $T_R$ which are unpredictable as to their timing, will be encompassed. At the very least, therefore, a large number of values of $T_R$ can be taken so that the unpredictable disturbances such as window openings, varying numbers of individuals present in the room, the use of heat-generating machines and the like, can be weighted in the measurements obtained and thus deviations in these disturbances rendered practically incapable of falsifying the results.

While the measurements necessary for the purposes of the invention can be taken without controlling the room temperature, best results are obtained when the measurements are taken as the room temperature is controlled.

As soon as the procedure for optimizing the heating curve is terminated, the advance heating temperature is controlled entirely in response to the external temperature in accordance with the optimized heating curve.

While this has been found to be adequate in most instances, from time to time it may be desirable, after optimization and during control of the advance heating temperature in accordance with the external temperature by the optimized heating curve to provide room temperature regulation as well. In this case, the heat exchangers for transferring heat from the heating medium of the space can be provided with thermostatic or thermostatically controlled valves. In these instances, the thermostatic room temperature regulation is superimposed upon the heating curve control.

To facilitate such room temperature regulation (referred to hereinafter also as local regulation), I have found it to be advisable to set the advance heating temperature to be somewhat higher than that established by the optimized heating curve for a given external temperature by, say, 1° to 3° C. This allows the local temperature regulation to be effected merely by throttling or dethrottling the flow of the heat exchanger so that the approach to the setpoint value of the room temperature (which would be 1° to 3° C. higher in the absence of such throttling) is effected by the throttle valves.

This has been found to provide especially high precision in control of room temperature.

Within the present invention, moreover, it is possible as in prior art techniques to provide a program which reduces the room temperature during certain times of the day. This can be effected in accordance with the present invention by providing a timer-controlled programmed reduction of the setpoint value of the room temperature of 8° to 16° C. In this case, the normal values of the parameter of the heating curve calculated for normal room temperatures can remain the same even for the intervals of reduced temperature and the drop artificially imposed by simply subtracting the appropriate value in preparing the curve or in utilizing the curve to control the room temperature.

Of course, it is also possible to prepare a heating curve with its parameters optimized to take into consideration the temperature-reduction interval and switch over to the use of this heating curve whose optimization equation will, of course, result in different parameters over the course of the heating operation utilizing the temperature reduction interval from the normal heating operation. When the temperature reduction is no longer necessary or desirable, the automatic program can cause the control system to revert to the use of the normal optimized heating curve.

Preferably over a predetermined time interval, the instantaneous values of $T_A$, $T_V$ and $T_R$, i.e. the triplet values, are determined and/or instantaneous values of $y=(T_V-T_R)$ and $u=(T_R-T_A)$ are obtained. The instantaneous values y and u are referred to as a value pair for the purposes of the invention and I may make use of either the triplet or the pair or both, or selected members of either.

Instead of the instantaneous values for each point in time, the values which are obtained may be average values over a number of measurements.

The values can be stored and from the stored values at least one parameter is calculated in the manner described.

Preferably, the process is carried out automatically in accordance with a predetermined program and under the control of a timer.

When, as is preferred, the instantaneous values of $T_A$, $T_V$ and $T_R$ are used to produce values of the temperature differences y and u, the calculation of the parameter or parameters of the heating curve equation and their transformation into adjustable control setpoint values of the room temperature is especially simple. It is because of this that I prefer to make use of heating curve equations in which the temperatures $T_A$, $T_V$ and $T_R$ appear in the form of the temperature differences y and u.

When, in accordance with a feature of the invention, average values of $\overline{T_A}$, $\overline{T_V}$, and $\overline{T_R}$, $\overline{y}$ and $\overline{u}$ are stored after having been calculated, from the corresponding instantaneous values, unpredictable transient disturbances to the room temperature as may occur by the opening of doors, windows or the like are still further limited in their significance with respect to the calculation of the parameter by comparison with the use of the nonaveraged instantaneous value $T_A$, $T_V$, $T_R$ or the pair y and u.

The heating curve equation can be used in whatever form best suits the manipulations to be carried out with it and the determination of the values required for use in calculating the parameters with it. In the simplest case, the heating curve can be treated as a straight line whose slope is determined by a single parameter which comprehends values which affect the room temperature such as constants relevant to the structure and to the heating plant.

In general it is better to approximate a heating curve with a nonlinear equation since, in this case, the control of the room temperature in dependence upon the external temperature according to the heating curve equation is far more precise. In this case, the parameters at usual room temperatures are generally independent of the absolute value of the room temperature.

Especially effective is the heating curve equation defined by the polynomial $$y = K_1 f_1(u) + K_2 f_2(u) + \ldots + K_M f_M(u) \quad (1)$$

$$= \sum_{j=1}^{M} K_j f_j(u) = \underline{K}\,\underline{f}^T(u)$$

The parameter vector representing each constant can be abbreviated as follows:

$$\underline{K} = \begin{bmatrix} K_1 \\ K_2 \\ \cdot \\ \cdot \\ K_M \end{bmatrix}$$

and the function vector can be given by the relationship
$f^T=[f_1(u) f_2(u) \ldots f_M(u)]$ Expecially advantageous, however, is the use of a heating curve corresponding to one of the three equations (2), (3) and (4).

$$y = K_1 u^{\alpha_1} \quad (2)$$

or $$y = K_1 u + K_2 u^{\alpha_2} \quad (3)$$

or $$y = K_1 u + K_2 u^{\alpha_3} + K_3 u^{\alpha_4} \quad (4)$$

where $\alpha_1$, $\alpha_2$, $\alpha_3$ and $\alpha_4$ are constants. Of course, equations with four or more parameters can be used as well where even greater precision may be required.

In the equations (3) and (4), $K_1$ represents the slope and the remaining terms the curvature of the heating curve. $K_1$, $K_2$, and $K_3$ are the parameters of the heating curve equations (2) to (4).

These parameters do not determine the setting of the control setpoint value for the room temperature, but only the path of the heating curve which represents the constants of the structure and the heating plant.

Of course other equations which relate to the constants of the structure and of the heating plant and can be used to calculate the heating curve can also be employed, if desired, although equation (2), (3) and (4) have been found to be the ones most generally applicable.

In practice, I have found that $\alpha_1$ can generally be approximately 0.8, that in most cases $\alpha_2$ and $\alpha_3$ should approximate 0.75 and that $\alpha_4$ should generally be about 0.5.

As will be apparent from the heating curve equations (1) to (4), selected room temperature setpoint values $T_R$ can be inserted and the associated equation will then supply the functional relationship (transfer function) between the exterior temperature $T_A$ and the advance heating temperature $T_V$. This, of course, gives an optimized heating curve.

The statistical calculation of the parameter or parameters of the heating curve equation for the measured values for $T_A$, $T_V$ and $T_R$ can be determined in various ways.

Preferably I make use of the nonrecursive estimation method of least squares. This estimation method is described in thé Isermann handbook, *Prozess Identifikation*, Springer-Verlag, Berlin, 1974.

In this estimation method, the parameter estimation vector $\hat{\underline{K}}$ for N measured values is given as $$\hat{\underline{K}} = \left[\underline{F}^T \underline{F}\right]^{-1} \underline{F}^T \underline{y}$$

whereby $$\underline{F} = \begin{bmatrix} \underline{f}^T(1) \\ \underline{f}^T(2) \\ \cdot \\ \cdot \\ \cdot \\ \underline{f}^T(N) \end{bmatrix}$$

$$= \begin{bmatrix} f_1(u(1)) & f_2(u(1)) & \ldots & f_M(u(1)) \\ f_1(u(2)) & f_2(u(2)) & \ldots & f_M(u(2)) \\ \cdot & \cdot & & \cdot \\ \cdot & \cdot & & \cdot \\ f_1(u(N)) & f_2(u(N)) & \ldots & f_M(u(N)) \end{bmatrix}$$

and $$\underline{y} = \begin{bmatrix} y(1) \\ y(2) \\ \cdot \\ \cdot \\ y(N) \end{bmatrix}$$

The parameter estimation can also be effected after each new measurement k ($k=0, 1, 2 \ldots$) from the parameter estimation of the preceding measurement (k−1). Thus:

$$\hat{\underline{K}}(k) = \hat{\underline{K}}(k-1) + \underline{\gamma}(k-1)[y(k) - \underline{f}^T(k)\hat{\underline{K}}(k-1)]$$

where $$\underline{\gamma}(k-1) = \frac{1}{\underline{f}^T(k)\underline{p}(k-1)\underline{f}(k)+1} \underline{p}(k-1)\underline{f}(k)$$

and $$\underline{p}(k) = [\underline{I} - \underline{\gamma}(k-1)\underline{f}^T(k)]\underline{p}(k-1)$$

where $$\underline{\gamma}(k-1) = \begin{bmatrix} \gamma_1(k-1) \\ \gamma_2(k-1) \\ \cdot \\ \cdot \\ \gamma_M(k-1) \end{bmatrix}$$

a correction vector is:

$$\underline{I} = \begin{bmatrix} 1 & 0 & \ldots & 0 \\ 0 & 1 & & \cdot \\ \cdot & & \ddots & \cdot \\ \cdot & & & 0 \\ 0 & 0 & & 0 & 1 \end{bmatrix}$$

and the standard matrix is:

$$\underline{p}(k) = [\underline{F}^T(k) \underline{F}(k)]^{-1} = \begin{bmatrix} p_{11}(k) & p_{12}(k) & \ldots & p_{1M}(k) \\ p_{21}(k) & p_{22}(k) & & \vdots \\ \cdot & & \ddots & \\ p_{M1}(k) & p_{M2}(k) & \ldots & p_{MM}(k) \end{bmatrix}$$

When room temperature regulation is to be superimposed during the heating curve optimization, the room temperature is held constant and in many cases for the parameter calculation, the actual or measured room temperature need not be used but the setpoint value of the room temperature $T_R$ can be employed, thereby simplifying the circuitry.

Also if the advance heating temperature $T_V$ is to be maintained substantially constant, to simplify the system further, one can introduce into the parameter calculation the instantaneous setpoint value of the advance heating temperature $T_V$ set.

Greater precision, however, is obtained when the instantaneous values $T_A$, $T_V$ and $T_R$ are actually measured. As indicated, it is not essential to regulate the room temperature during the optimization and, indeed, the room temperature can vary during the optimization, especially when the temperature differences y and u are utilized. In this case, the superimposed temperature regulation need not be used.

Optimization with only control of the room temperature in accordance with the heating curve can be effected in various ways. For example, in a preferred mode of the invention, control is effected in accordance with a predetermined starting heating curve until the measurements allowing optimization of the normal heating curve are obtained and thereafter the heating curve is optimized through the use of the heating curve equations as described.

In another possibility, during the optimization, the parameter calculations are carried out a multiplicity of times and the actual heating curve is recalculated from the last heating curve equation as so adjusted. Since the starting curve because of the manual setting thereof initially can be comparatively false, each new heating curve calculation is made upon the basis of the previous calculation or heating curve or equation and without referring back to the starting heating curve. Of course, the starting heating curve can also be incorporated in each new determination for optimization.

The heating curve equation can be stored in any suitable way or in any suitable device. For example, it can be stored in an electric resistor network, bridge or matrix including a resistor sensitive to the external temperature, the external temperature sensor, and a further adjustable resistor for setting the parameter by hand or by means of a servomotor to generate the calculated parameter. The setting is preferably affected automatically. However, it is possible to display the parameter or print it out and then adjust the parameter potentiometer by hand. Preferably the heating curve is automatically adjusted.

It has been found to be especially advantageous to digitally store the calculated heating curve equation and to control or regulate the advance heating temperature. In this case, both the optimizing device and the heating curve generator can include digital electronic calculators, computers or microprocessors.

The heating curve can be calculated according to the values obtained as they vary uninterruptedly or with values which are commutated or sampled, i.e. by monitoring values at predetermined time intervals cyclically. In the latter case once the setpoint value for the advance heating temperature is calculated, this value is used to regulate or control the temperature of the fluid medium until the next setpoint value is calculated from the next collection of data.

The invention also relates to an apparatus or system for carrying out the present invention and this apparatus can comprise circuit points or terminals for the delivery of instantaneous values for $T_A$, $T_V$ and $T_R$ which are generated by respective sensors. Means can be provided to form the temperature difference signals $y = T_V - T_R$ and $u = T_R - T_A$. The system also includes storage or memory means for storing signals representing the values of the triplets $T_A$, $T_V$, $T_R$ or of the temperature differential pairs, y, u, and calculating or computing means for calculating at least one parameter of the heating curve equation by a statistical regression method, parameter estimation method, of at least two stored triplets $T_A$, $T_V$, $T_R$ or from at least two temperature differential pairs (y, u) or one such triplet and one such pair.

Naturally means can also be provided for setting a control element generating the heat curve, i. e. the controller of the heating system, in accordance with the calculated parameter or parameters.

The apparatus of the invention can be economically made utilizing modern microprocessor techniques and preferably timing means is provided for the timed and advantageously cyclical control of at least one of the following procedures:

(a) monitoring the instantaneous values of one or more $T_A$, $T_V$, $T_R$ to tap or sample these values for processing by the microprocessor circuitry;

(b) forming one or both of the temperature differentials $T_R - T_A$ and $T_V - T_R$, and delivering a signal representing the value of the differential thus formed to the microprocessor;

(c) forming the average values of one or more of the instantaneous values $T_A$, $T_V$, $T_R$ or y and u, preferably a group of such values sufficient to enable calculation of the parameter of the heating curve equation;

(d) calculation of at least one parameter of the heating curve equation or calculation of the heating curve or the control equation with use of at least one calculated parameter; and (e) setting or resetting, adjusting or readjusting the heating curve outputted by a heating curve generator in accordance with at least one calculated parameter or in accordance with the calculated heating curve equation.

With such a system, the calculation of the parameter or parameters and even the setting or resetting of the heating curve equation can be fully automatic under the control of a timer and can be effective over a predetermined time period, generally a time period of several days. At the conclusion of this automatic optimization process, the optimized heating curve can be used exclusively for regulation or control of the advance heating temperature in dependence upon the external temperature, and it is not necessary to cut out or remove the components which were utilized for optimization.

Preferably, however, the componenets utilized in the optimization can be provided in a optimizing unit connectable to or forming part of and, if desired, disconnectable from the heating curve generator. This unit can then be transferred from one building, structure or zone to another building, structure or zone for optimization of the heating curves of several systems according to the invention in succession.

Because the unit is of comparatively low cost, it can even remain in place for use whenever a new heating curve must be calculated or optimized, e.g. when building renovations, additions and the like are made and require reoptimization or the establishment of a new heating curve. In addition, the unit is available for reoptimization of the heating curve when necessary at the beginning of each heating period or even after long heating intervals in which natural changes may occur which make reoptimization advantageous. Both the optimizing unit and the heating curve generator or the means of the latter for regulating or controlling the advance heating temperature can be, or can include microprocessors of the type described.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
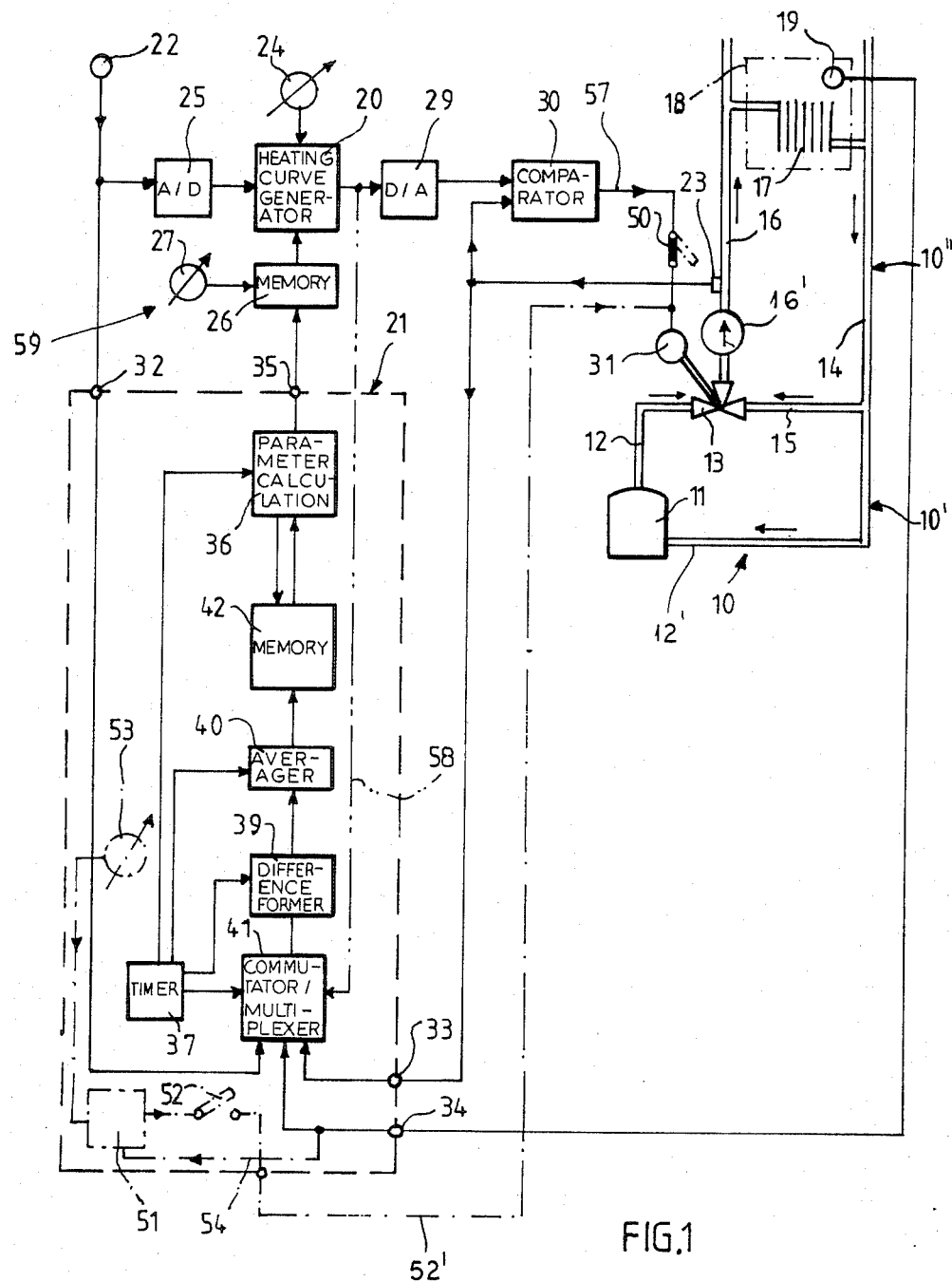
FIG. 1 is a block diagram in part and a heating medium flow diagram in part schematically illustrating the principles of the present invention in the optimization of the heating curve of the heating unit.

The heating unit represented in FIG. 1 can be a heating plant or an entire building or an independent zone of the building, for one or more rooms, or for any system in which space heating by a single control is required. The heating unit as a whole is represented by 10, the heating fluid circulation or heating circuit is represented at 10', and the space heating circuit at 10". The circuit 10' can be considered the boiler circuit and comprises the boiler 11 or some other means for raising the temperature of a heating fluid e.g. water, which is delivered to a mixing valve 13. The depleted fluid return is represented at 12' in the boiler circuit 10'.

The three-port mixing valve 13 which is electrically controlled as represented by the electrical operator 31 for this valve, connects the boiler circulation 10' with the heating zone circulation 10".

One port of this valve is connected to the high temperature boiler outlet pipe 12 previously mentioned. A second port of the valve 13 is connected to the return line 14 of the circulations via a branch pipe 14, the return line 14 also being connected to the boiler via the line 12'. The single outlet port of the valve 13 is connected to the feed line 16 of the space heating circuit 10" via, for example a circulator pump 16' which can be omitted in the case of a convection circulation system.

It is the temperature within line 16 which is controlled in accordance with the present invention to correspond to the advance heating temperature $T_V$ setpoint value.

The line 16 serves the space heating heat exchangers as represented at 17 and only one of which has been illustrated. Naturally, a large number of such heat exchangers can be provided in parallel or in series to heat respective rooms 18, one of which is shown symbolically in dot-dash lines in FIG. 1. Thus a number of rooms can be heated and a number of heat exchangers can be provided in each room, the heat exchangers in each room being connected in series or in parallel, and the heat exchangers of several rooms being connected in series or in parallel.

Figure 2:
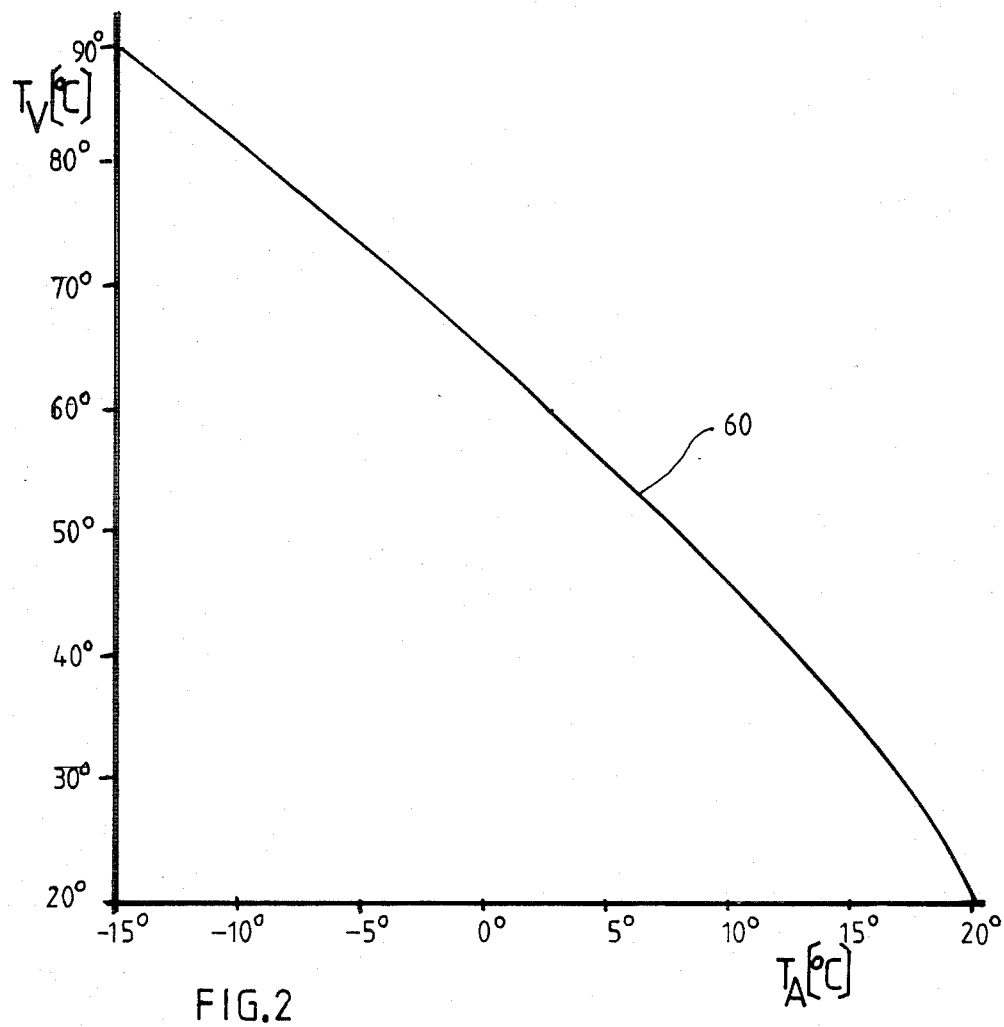
FIG. 2 is a heating curve corresponding to the heating curve equation (3) given previously and wherein the advance heating temperature $T_V$ is plotted in degrees centigrade along the ordinate while the external temperature $T_A$ is plotted in degrees centigrade along the abscissa.

For optimization of the heating curve, one room, e.g. the room 18 is selected as the test room and a temperature sensor 19 is provided therein to deliver the instantaneous value $T_R$ to the control or regulating circuitry. The heating curve is delivered by a heating curve generator 20 and is optimized by the optimizing circuit 21 which is shown to be connected at terminals 32 and 35 releasably to the heating curve generator. In general, the heating curve generator can be thought of as a microprocessor controlled transfer function generator which responds to the external temperature $T_A$ measured at 22 and delivers a control signal for the advance heating temperature $T_V$ to the operator 31 in accordance with the optimized heating curve (FIG. 2).

The optimizing unit 21 also is preferably a microprocessor controlled circuit which operates by calculating a parameter of the equation defining the heating curve by a statistical regression process so that the optimized heating curve accurately represents constants of the structure or room.

Before the optimized device and its operation is described in greater detail, the control of the room temperature subsequent to optimization will be reviewed.

This control is effected in response to the external temperature $T_A$ detected by the external temperature sensor 22 and in accordance with the heat curve equation which establishes, as noted, the advance heating temperature in a feedback circuit utilizing the sensor 23 for the actual value of the advance heating temperature $T_V$. In the system shown, the actual value of the advance heating temperature is established by the controlled mixing of water from the boiler 11 at the maximum boiler water temperature with the water recirculated by the pump 16' in the heating circuit 10''. The heating curve 60 is provided in FIG. 2 by way of example to show a heating curve calculated from equation (3) given above for an actual building. As the external temperature decreases along the abscissa, the higher must be advance heating temperature $T_V$ at the heating system to give a certain room temperature.

The selected room temperature is set at the setpoint input 24 which represents a signal generator supplying to the circuit 20 an electrical signal representing the desired value of the room temperature $T_R$ which is to be maintained. The set-point input 24 thus provides a measure of the controlled value of the room temperature for the heating curve generator 20.

The heating curve generator 20 is, in the best mode embodiment of the invention, a special purpose digital computer which is provided with a microprocessor controlled CPU and is so programmed (see below) that it calculates the heating curve according to a predetermined equation having at least one parameter $K_j$ which is stored in a memory 26 and which is supplied to the heating curve generator for each calculation of the setpoint value of the advance heating temperature or is continuously supplied.

The temperature sensor 22 measures the external temperature to provide an analog electrical output representing the instantaneous temperature and this output is digitalized in an analog/digital converter 25 (see page 421 of *Digital Computer Circuits and Concepts*, Reston Publishing Co., Reston, Va., 1980).

The output of the analog/digital converter 25 is a digital signal proportional to the external temperature $T_A$ which is supplied continuously or cyclically or periodically to the heating curve generator 20.

The introduction of values of a parameter or parameters which are utilized in the equation and are stored at 26 can be supplied by hand through manual inputs 27 or automatically from the optimizing circuit 21.

If the heat curve equation corresponds to equation (3) where $a_2$ is 0.75, the memory 26 (see chapter 12 of the *Handbook of Telemetry and Remote Control*, McGraw Hill Book Co., 1967, and pages 342 ff. of *Digital Computer Circuits and Concepts*) stores values of the parameters $K_1$ and $K_2$ so that the heating curve generator 20 produces the instantaneous setpoint value $T_V$ set for a given advance heating temperature $T_V$ of $$T_{Vset} = K_1 u + K_2 u^{0.75} + T_R \qquad (5)$$

The heating curve generator 20 calculates the setpoint value $T_{Vset}$ cyclically, for example, uninterruptedly or at time intervals of several seconds or minutes, so that each newly calculated setpoint $T_{Vset}$ remains effective until the next value is calculated.

The digital output signal $T_{Vset}$ can be transformed in a digital/analog converter, (chapter 8, page 43 and chapter 12, page 7 of *Handbook of Telemetry and Remote Control*) as shown at 29 into an analog signal proportional to the setpoint value $T_{Vset}$. This setpoint value is applied to a temperature controller 30 which represents a comparator for the setpoint signal and a feedback signal from the sensor 23, producing an error or control signal 57 which is applied to the electrical operator 31 of the valve 13. The comparator 30 can be of the type described at pages 249-261 of *Pulse, Digital and Switching Waveforms*, McGraw Hill Book Co., New York, 1965.

The controller 30 thus forms a difference $T_{Vset} - T_{Vact}$ between the setpoint value and the measured or actual value of $T_V$ and operates the valve 13 to minimize this difference. Valve operator 31 may be a servomotor (see pages 276-280 of *Servomechanism Practice*, McGraw Hill Book Co., New York, 1960).

With progressive closing of the connection to the boiler, cold return water is increasingly recycled to reduce the temperature $T_V$ and with increasing supply of the boiler water, the less cold water is recycled to increase the temperature $T_V$.

This type of room temperature control is effective to maintain a substantially constant room temperature independent of the external temperature, for example, a room temperature of 20° C. or any other room temperature which may be selected at 24, if the parameters $K_1$ and $K_2$ accurately represent the constants of the structure and the heating unit. The optimizing device 21 serves for automatic optimization of these parameters $K_1$ and $K_2$ and thus for automatic optimization of the heating curve.

The optimizing device can be selectively connected to the electronic room temperature control system 59 by terminals 32, 33, 34 which can represent plug and jack or like connectors for the external temperature sensor 22, the advance heating temperature sensor 23, the room temperature sensor 19 and for the output of the parameter calculator 36 of the optimizing device, respectively.

The optimizing circuit 21 comprises a sensor interface 21 which can be a multiplexing or commutating circuit (pages 237 and 238 of *Digital Circuits and Concepts*, op.cit.) or some other commutator for receiving the instantaneous inputs via terminals 32, 33 and 34 of the external temperature $T_A$, the actual advance, heating temperature $T_V$ and the room temperature $T_R$ and applying these instantaneous values in a programmed and timed sequence e.g. under the control of a clock 37 periodically to a difference circuit 39 which generates the instantaneous values of the differences $y = T_V - T_R$ and $u = T_R - T_A$. The difference-forming circuit can be of the type described at chapter 15, pages 73 and 74 of the *Handbook of Telemetry and Remote Control*, op.cit.

These differences can be applied to an averaging circuit 20 which receives a series of values y and u over a given time interval and calculates the mean values over this interval, i.e. the values of $\bar{y}$ and $\bar{u}$. A suitable time interval can be two hours and the instantaneous values $T_A$, $T_V$ and $T_R$ can be sampled for example, every ten minutes. Consequently, during the two hour interval, 12 pairs of values y, u are obtained and the averaging circuit 40 produces two mean values $\bar{y}$ and $\bar{u}$ averaged over two hours. These average values are then stored in a data memory 42. The time intervals over which the average values y and u are formed need not be successive and, indeed, an interval can elapse within which no values are generated. For example, dependent on the programming effected by the timer 37, one or more measurement periods can be provided per day, several measurement periods can be provided on each of several days which may be spaced apart by days during which no measurements are taken, or on different days varying numbers of measurement intervals can be provided.

The timer also serves to initiate optimization calculation following a measurement and determination of the mean values $\bar{y}$ and $\bar{u}$ stored in the memory 42. The optimization can be effective also continuously, several times a day, daily, several times a week, or even with spacing by a week or more.

For parameter calculation, the clock 37 supplies the microprocessor controlled microcomputer 36 with a signal intended to initiate calculation of the parameters $K_1$ and $K_2$ according to a statistical regression method, i.e. the parameter estimation method previously described utilizing the mean values $\bar{y}$ and $\bar{u}$ stored in the memory 42. After following the algorithm for the parameter estimation method which is programmed into the microcomputer 36, the thus estimated parameters $K_1$ and $K_2$ are delivered to the memory 26 and the previously stored values for $K_1$ and $K_2$ in this memory are elminated.

The newly calculated parameters remain stored and effective for each calculation of the advance heating temperature setpoint value in the manner previously described. After optimization over a prolonged period of the heating curve in this manner, the optimization unit 21 can be removed from the control circuit 59 and utilized for the heat curve optimization of other buildings. Alternatively it can remain in place and can be integrated with the circuit 59 so that it is possible to effect heat curve optimization from time to time.

Instead of the aforedescribed optimization process, the optimizing unit 21 can be programmed in a different way. For example, the clock 37 can be used to initiate multiparameter calculations during each optimization interval so that after each input of a predetermined number of average values $\bar{y}$ and $\bar{u}$, the microcomputer 36 calculates the parameter utilizing all of the average values stores since the beginning of the optimization operation and, after each optimization, the newly calculated parameters $K_1$ and $K_2$ are stored in the memory 26 while the previous values of these parameters are extinguished.

A parameter calculation can be effected, for example, each time two to five or even more mean values $\bar{y}$ and $\bar{u}$ are collected so that increasing numbers of parameter calculations with increasing numbers of the stored mean values $\bar{y}$ and $\bar{u}$ which go into each calculation, the latest calculated values of the parameters $K_1$ and $K_2$ are far more precise than each immediately preceding calculation.

Naturally, this also means the control of the room temperature $T_R$ is effected during each subsequent interval in response to a heating curve equation which is improved over or more accurate than the heating curve equation which applied during the interval when the previously calculated parameters $K_1$ and $K_2$ were applicable.

For instance, if mean values y and u are determined twice a day, calculated and stored in the memory 42, the timer 37 can be programmed so that each time two new mean values $\bar{y}$ and $\bar{u}$ are obtained, i.e. once each day, a new parameter calculation is initiated in the microcomputer 36.

On the first day the parameter calculation is thus effected with only two mean values $\bar{y}$ and $\bar{u}$. On the second day, the calculation utilizes four mean values $\bar{y}$ and $\bar{u}$, while on the third day, six mean values $\bar{y}$ and $\bar{u}$ are utilized in calculating the parameters, and so forth.

The mean values $\bar{y}$ and $\bar{u}$ stored in the memory 40 can also be weighted differently and thus, according to a feature of the invention have less weight the longer the values remain in storage, i.e. in the memory 40 for specific use.

According to another feature of the invention, instead of introducing starting values of $K_1$ and $K_2$ into the memory 26 by means of the input circuit element 27, manually introduced starting values of $\bar{y}$ and $\bar{u}$ can be introduced and the starting parameters $K_1$ and $K_2$ can be calculated back by the microcomputer and then these parameters $K_1$ and $K_2$ can be stored in the memory 26.

The starting values of $\bar{y}$ and $\bar{u}$ can then be replaced by the mean values which actually result from measurements of $T_A$, $T_V$ and $T_R$ in the manner described and the initially selected mean values $\bar{y}$ and $\bar{u}$ can be discarded or canceled from the memory 40 since they are largely false or inconsistent with more valid data.

The precision of the parameter calculation can be improved or the parameters $K_1$ and $K_2$ can be calculated with fewer temperature difference pairs y, u when, during optimization, the room temperature $T_R$ is additionally regulated to have a substantially constant value, i.e. during the optimization, control of the advance heating temperature $T_V$ by means of the feedback operation of the controller 30 is cut off. In this case, a switch 50 can disconnect the controller 30 from the servomotor 31 and in place of the controller 30, a room temperature regulator 51 can be provided in the optimizing unit 21 and can be connected to the servomotor 31 by a switch 52.

This room temperature regulator 51 can be used to generate a setpoint by means of a room temperature setpoint input 53 which can be adjusted by hand and which feeds this input to a comparator or controller represented in dot-dash lines as part of the temperature regulator. The instantaneous actual value of the room temperature is tapped by line 54 from the room temperature sensor 19.

In this case, the difference between the setpoint and actual values of the room temperature generates a difference signal which is applied by line 52' to the servomotor 31 and the controller or comparator 51 operates so as to minimize this difference.

In this case it is advantageous to calculate the parameters $K_1$ and $K_2$ only at the end of an optimization in the interval established by the timer 37 by optimization utilizing all of the mean values $\bar{y}$ and $\bar{u}$ stored in the memory 42. As soon as this process provides newly calculated values of $K_1$ and $K_2$ and these values are stored in the memory 26, switch 52 is again opened and switch 50 closed so that the advance heating temperature is thereafter controlled in dependence upon the external temperature utilizing the values of $K_1$ and $K_2$ stored in the memory 26 as a result of the temperature regulation. The optimizing unit as a whole can then be disconnected.

When regulation of the room temperature is effected by means of the controller 51, the setpoint value produced by the generator 53 and representing the room temperature setpoint can in many cases be fed to the sensor commutator or multiplexor instead of the actual room temperature value. In many cases as well, the setpoint $T_{Vset}$ of the advance heating temperature can be applied via line 58 to the unit 41 instead of the corresponding actual value $T_{Vact}$.

It is also possible to omit or disconnect the averager 40 in the optimizing device and to apply the measurements of the temperature differential pairs y, u from the difference-calculating circuit 39 directly to the storage 42. The use of the averager or mean-value former 40, however, reduces the number of values which must be manipulated for an effective calculation of the circulated parameter.

Since the multiplexor 41, forming a sensing unit, simultaneously receives all three measured values $T_A$, $T_V$, $T_R$, or samples them substantially simultaneously or in a rapid alternation sequence, for each point in time, a respective triplet $T_A$, $T_V$, $T_V$ can be assigned and this triplet is transformed in the difference-forming circuit into an instantaneous value pair (y, u).

The averager 40 receives these pairs in time-spaced succession and calculates mean values $\bar{y}$ and $\bar{u}$ from the terms of this pair.

The plurality of instantaneous values y from which the mean value $\bar{y}$ is calculated forms an instantaneous value grouping of the instantaneous values y and correspondingly, the plurality of instantaneous values of u which form a given mean value $\bar{u}$ constitute an instantaneous value group of the instantaneous values u calculated by the difference circuit.

In place of the aforedescribed analog advance temperature controller 30, a digital controller can be used and in this case the digital-analog converter 29 can be omitted.

Instead of a digital heating curve generator 20, an analog heating curve generator can be used, in which case, a digital-analog converter may be required between the output of the optimizing circuit and this heating curve generator.

By way of an example, algorithms for recursive and non-recursive least square estimation methods for use in the present invention are provided below:

Example of the Recursive Least Square Method

For the heating curve at the time k, one obtains:

$$y(k) = K_1 u(k) + K_2 u^{0.75}(k) = \underline{K}(k) \underline{f}^T(k)$$

whereby $$\underline{K}(k) = \begin{bmatrix} K_1(k) \\ K_2(k) \end{bmatrix} \; ; \underline{f}^T(k) = [u(k) \; u^{0.75}(k)]$$

The least square recursive method can be effected in accordance with the following equations which are programmed in the sequence given:

(a) At the time k, new measurements y(k) and u(k) are made and the following function is formed:

$$\underline{f}^T(k) = [u(k) u^{0.75}(k)] = [f_1(k) f_2(k)]$$

(b) The following calculations are then made:

$$\underline{p}(k-1)\underline{f}(k) = \begin{bmatrix} p_{11}(k-1) & p_{12}(k-1) \\ p_{21}(k-1) & p_{22}(k-1) \end{bmatrix} \begin{bmatrix} f_1(k) \\ f_2(k) \end{bmatrix} =$$

$$\begin{bmatrix} p_{11}(k-1)f_1(k) + p_{12}(k-1)f_2(k) \\ p_{21}(k-1)f_1(k) + p_{22}(k-1)f_2(k) \end{bmatrix} = \begin{bmatrix} i_1(k-1) \\ i_2(k-1) \end{bmatrix}$$

In the foregoing, P(k−1) is taken from a prior recursive calculation from (g).

(c) The following scalar is then calculated:

$$\underline{f}^T(k) \underline{p}(k-1) \underline{f}(k) = p_{11}(k-1) f_1^2(k) =$$

$$[p_{12}(k-1) + p_{21}(k-1)]f_1(k)f_2(k) + p_{22}(k-1)f_2^2(k) = j(k-1).$$

(d) The correction vector is then calculated $$\underline{\gamma}(k-1) = \begin{bmatrix} \gamma_1(k-1) \\ \gamma_2(k-1) \end{bmatrix} = \frac{1}{j(k-1)+1} \begin{bmatrix} i_1(k-1) \\ i_2(k-1) \end{bmatrix}.$$

(e) The error of fit is then calculated from a prior paramater estimation value;

$$e(k) = y(k) - \underline{f}^T(k) \underline{\hat{K}}(k-1)$$

$$= y(k) - [f_1(k) \; f_2(k)] \begin{bmatrix} \hat{K}_1(k-1) \\ \hat{K}_2(k-1) \end{bmatrix}$$

(f) The new parameter estimation value is given by $$\underline{K}(k) = \begin{bmatrix} \hat{K}_1(k) \\ \hat{K}_2(k) \end{bmatrix} = \begin{bmatrix} \hat{K}_1(k-1) \\ \hat{K}_2(k-1) \end{bmatrix} + \begin{bmatrix} \gamma_1(k-1) \\ \gamma_2(k-1) \end{bmatrix} e(k)$$

(g) The matrix P(k) required for the next recursion segment is given as $$p(k) = \begin{bmatrix} 1 - \gamma_1(k-1)f_1(k) & -\gamma_1(k-1)f_2(k) \\ -\gamma_2(k-1)f_1(k) & 1 - \gamma_2(k-1)f_2(k) \end{bmatrix} \begin{bmatrix} p_{11}(k-1) \, p_{12}(k-1) \\ p_{21}(k-1) \, p_{22}(k-1) \end{bmatrix}$$

(h) Then k is replaced by k+1 and the algorithm is begun again at (a).

For the recursive parameter estimation algorithm to start at k=0:

$$\hat{K}(0) = \begin{bmatrix} \hat{K}_1(0) \\ \hat{K}_2(0) \end{bmatrix} \text{ und } p(0) = \begin{bmatrix} \alpha & 0 \\ 0 & \alpha \end{bmatrix}$$

in which $K_1(0)$ and $K_2(0)$ are starting estimated values, e.g. corresponding to a starting heating curve and can even be zero while $\alpha$ is a large number, preferably greater than 100.

Example for the Nonrecursive Least Square Method

By way of example, the heating curve $$y(k) = K_1 u(k) + K_2 u^{0.75}(k) = K(k)f^T(k)$$

is selected in which $$K(k) = \begin{bmatrix} K_1(k) \\ K_2(k) \end{bmatrix} \; ; f^T(k) = [u(k) u^{0.75}(k)].$$

The nonrecursive method of least squares utilizes the estimation equation:

$$\hat{K}(N) = N[F^T F]^{-1} \frac{1}{N} [F^T y].$$

This equation, over the measuring time N, gives rise to the following correlation functions:

$$\phi_{11} = \frac{1}{N} \sum_{k=1}^{N} u^2(k)$$

$$\phi_{22} = \frac{1}{N} \sum_{k=1}^{N} [u^{0.75}(k)]^2$$

$$\phi_{12} = \frac{1}{N} \sum_{k=1}^{N} u(k) u^{0.75}(k) = \phi_{21}$$

$$\phi_{1y} = \frac{1}{N} \sum_{k=1}^{N} u(k) y(k)$$

$$\phi_{2y} = \frac{1}{N} \sum_{k=1}^{N} u^{0.75}(k) y(k)$$

From the foregoing it can be seen that:

$$\frac{1}{N} F^T F = \begin{bmatrix} \phi_{11} & \phi_{12} \\ \phi_{12} & \phi_{22} \end{bmatrix}$$

$$\frac{1}{N} F^T y = \begin{bmatrix} \phi_{1y} \\ \phi_{2y} \end{bmatrix}$$

For the inverse matrix, by definition $$N[F^T F]^{-1} = N \frac{\text{adj } [F^T F]}{\text{det } [F^T F]}$$

$$= \frac{1}{\phi_{22} \phi_{11} - \phi_{12}^2} \begin{bmatrix} \phi_{22} & \phi_{12} \\ \phi_{12} & \phi_{11} \end{bmatrix}$$

where adj represents the adjoint matrix and det stands for the determinant.

The estimated parameter at the point in time N thus is given by $$\hat{K}(N) = \begin{bmatrix} \hat{K}_1(N) \\ \hat{K}_2(N) \end{bmatrix} = \frac{1}{\phi_{22} \phi_{11} - \phi_{12}^2} \begin{bmatrix} \phi_{22}\phi_{1y} + \phi_{12}\phi_{2y} \\ \phi_{12}\phi_{1y} + \phi_{11}\phi_{2y} \end{bmatrix}$$

In the event no power calculation is used and only the basic calculation is effected, for example $y = u$ 0.75 calculated by Newtonian root improvement in which for example, $y = [[u^3]^{\frac{1}{2}}]^{\frac{1}{2}}$ and the root given as $w\sqrt{z}$ and $z = w^2$ with $f(w) = w^2 - z = 0$, the calculation being carried out numerically in accordance with, for example, the method of Zurmühl, Praktische Mathematik, Springer-Verlag, Berlin, 1965.

The invention is not only practical with hot water systems, but can also be used with steam and other heating systems and fluids. For example, the system can be used for the advance heating temperature of air to be supplied directly to the space to be heated in an air-heating system and part or all of the air in the space can be recirculated or vented or replaced with fresh air.

In the example of FIG. 1, the heating curve used is that of FIG. 2 which provides a relationship between the external temperature $T_A$ and the advance heating temperature $T_V$. Other possible heating circuits utilizing other relationships can be utilized as well. For example, the return-fluid temperature can be utilized as a guide and the latter temperature control in accordance with the external temperature. Finally, the volume rate of flow of the heating medium can be controlled in response to the external temperature when the heating medium is available at a constant temperature.

I claim:

1. In a method of operating a heating system in which a heating fluid for the heating of at least one room is brought to an advance heating temperature and has a heating capability which can be represented by a value $T_V$ before being used to heat said room and a temperature $T_R$ representing the heating effect in terms of room temperature and resulting from use of the heating fluid is controlled in dependence upon an external temperature $T_A$ in accordance with a heating curve, the improvement which comprises optimizing said heating curve by approximating the heating curve with a heating curve equation including at least one parameter, automatically determining a number of values for said parameter in time-spaced succession with each value being established by a statistical regression method from values at least in part determined by instantaneous values of $T_A$, $T_V$ and $T_R$, substituting the parameter thus determined in said equation to thereby increase the precision of the heating curve with which the temperature of the room is controlled, and storing values determined by said instantaneous values, averaging the stored values, and determining the values for said parameter from the averaged stored values, the values which are stored and averaged being values $y = T_V - T_R$ and $u = T_R - T_A$ representing temperature differences, at least for initial optimization of said heating curve, the room temperature being controlled from a predetermined starting heating curve and thereafter, the room temperature being controlled by a previously optimized heating curve.

2. The method defined in claim 1 wherein the statistical regression method is a least squares estimation method.

3. The method defined in caim 1 wherein the paramater is determined from values of $$y = T_V - T_R$$

and $$u = T_R - T_A$$

in accordance with one of the heating curve equations $$y = K_1 u^{\alpha 1}$$

$$y = K_1 u + K_2 u^{\alpha 2}, \text{ and}$$

$$y = \sum_j^M K_j u^{\alpha j}$$

where $K_1$, $K_2$ and $K_j$ represent the determined parameter, $\alpha_1$, $\alpha_2$, and $\alpha_j$ represent constants and M is equal to or greater than 3.

4. The method defined in claim 1 wherein, during the optimizing of said heating curve, the temperature in said space is regulated in a manner tending to maintain a predetermined setpoint value thereof.

5. The method defined in claim 1 wherein the parameter is determined directly from instantaneous measured values of $T_A$, $T_V$ and $T_R$.

6. The method defined in claim 5 wherein the optimization operation is carried out a number of times and the room temperature is controlled for each calculation of the parameter in accordance with the heating curve equation obtained utilizing the previously calculated parameter.

7. The method defined in claim 1 wherein the heating curve equation in which the parameter is substituted is digitally stored and is used to automatically control the advance heating temperature of the fluid for said room based upon the stored heating curve in response to external temperature.

8. The method defined in claim 1 wherein a heating curve generator is provided and the determined parameter is fed as an input signal to control said heating curve generator.

9. A system for optimizing a heating curve in the operation of a heating plant for the heating of at least one room to a temperature $T_R$ by bringing the temperature of a heating fluid to an advance heating temperature $T_V$ before said heating fluid is circulated along a path including said room, said heating curve relating the external temperature $T_A$ to said advance heating temperature $T_V$, said system comprising:
a control unit including,
external temperature sensor,
a heating curve generator having a variable transfer function representing said heating curve and connected to said external temperature sensor, and
means responsive to said heating curve generator for controlling the temperature of said fluid to establish the advance heating temperature thereof; and
an optimizing unit connected to said control unit and including
means for ascertaining instantaneous values of $T_A$, $T_V$ and $T_R$,
an averager connected to said means for ascertaining said instantaneous values, forming temperature difference values $y = T_V - T_R$ and $u = T_R - T_A$,
storage means for storing at least some of said values,
means for automatically generating a parameter from at least some of said values for a heating curve equation approximating said heating curve, and means for adjusting said transfer function of said generator of said unit in response to the determined parameter, thereby optimizing the heating curve with which the temperature of said room is controlled.

10. The system defined in claim 9, further comprising a temperature regulator in said optimizing unit for responding to the room temperature $T_R$ and independently of said control unit, varying $T_V$ to maintain $T_R$ at a setpoint value thereof.

11. The system defined in claim 9, further comprising connector means for connecting and disconnecting said optimizing unit from said control unit.

12. The sytem defined in claim 9 wherein said fluid is water.

13. The system as defined in claim 9 wherein said fluid is air.

14. The method defined in claim 1 wherein the value $T_V$ is the instantaneous value of the advance heating temperature to which said heating fluid is brought.

* * * * *